United States Patent [19]

Swanson

[11] Patent Number: 4,875,783

[45] Date of Patent: Oct. 24, 1989

[54] TEMPERATURE TRANSDUCER FOR KYZ PULSE RECORDER

[75] Inventor: Scott C. Swanson, Roswell, Ga.

[73] Assignee: Sangamo Weston, Inc., Norcross, Ga.

[21] Appl. No.: 41,274

[22] Filed: Apr. 22, 1987

[51] Int. Cl.⁴ .............................................. G01K 7/00
[52] U.S. Cl. .................................. 374/170; 374/178; 374/186
[58] Field of Search ............... 374/186, 170, 178, 171; 346/33 TP; 377/25; 379/107

[56] References Cited

U.S. PATENT DOCUMENTS

| | | | |
|---|---|---|---|
| 3,978,471 | 8/1976 | Kelly | 374/170 |
| 4,277,975 | 7/1981 | Pinkham | 374/170 |
| 4,615,009 | 9/1986 | Battocletti et al. | 364/483 |
| 4,697,182 | 9/1987 | Swanson | 340/870.02 |

FOREIGN PATENT DOCUMENTS 76085  6/1977  Japan .................................. 374/170

OTHER PUBLICATIONS

"Integrator Circuits", John Markus, *Modern Electronic Circuits Reference Manual*, Chapter 41, pp. 468–472, McGraw–Hill, Inc., 1980.
"Temperature Measuring Circuits", John Markus, *Modern Electronic Circuits Reference Manual*, Chapter 94, pp. 1049–1063, McGraw–Hill, Inc., 1980.
"Technotes Metretek Temperature Monitor", Metretek Incorporated, date unknown.

Primary Examiner—William A. Cuchlinski, Jr.
Assistant Examiner—W. Morris Worth
Attorney, Agent, or Firm—Sanford J. Asman

[57] ABSTRACT

An improved temperature transducer for use with a KYZ pulse data recorder. A temperature sensor provides a temperature signal proportional to ambient temperature. An integrator circuit and comparator circuit responsive to the temperature signal provides pulses at a frequency which is proportional to temperature. The pulses are provided over the standard three-wire KYZ pulse cable to the input of the data recorder. The circuit is extremely low power, highly accurate, and requires only the three-wire KYZ connection. No external power supply or cable is required, since the circuit draws its power from the pull up resistors in the KYZ data recorder input. Also disclosed are techniques for improving accuracy and minimizing power consumption in the circuit, and an improved integrator circuit.

10 Claims, 3 Drawing Sheets

INTEGRATOR AND PULSE OUTPUTS

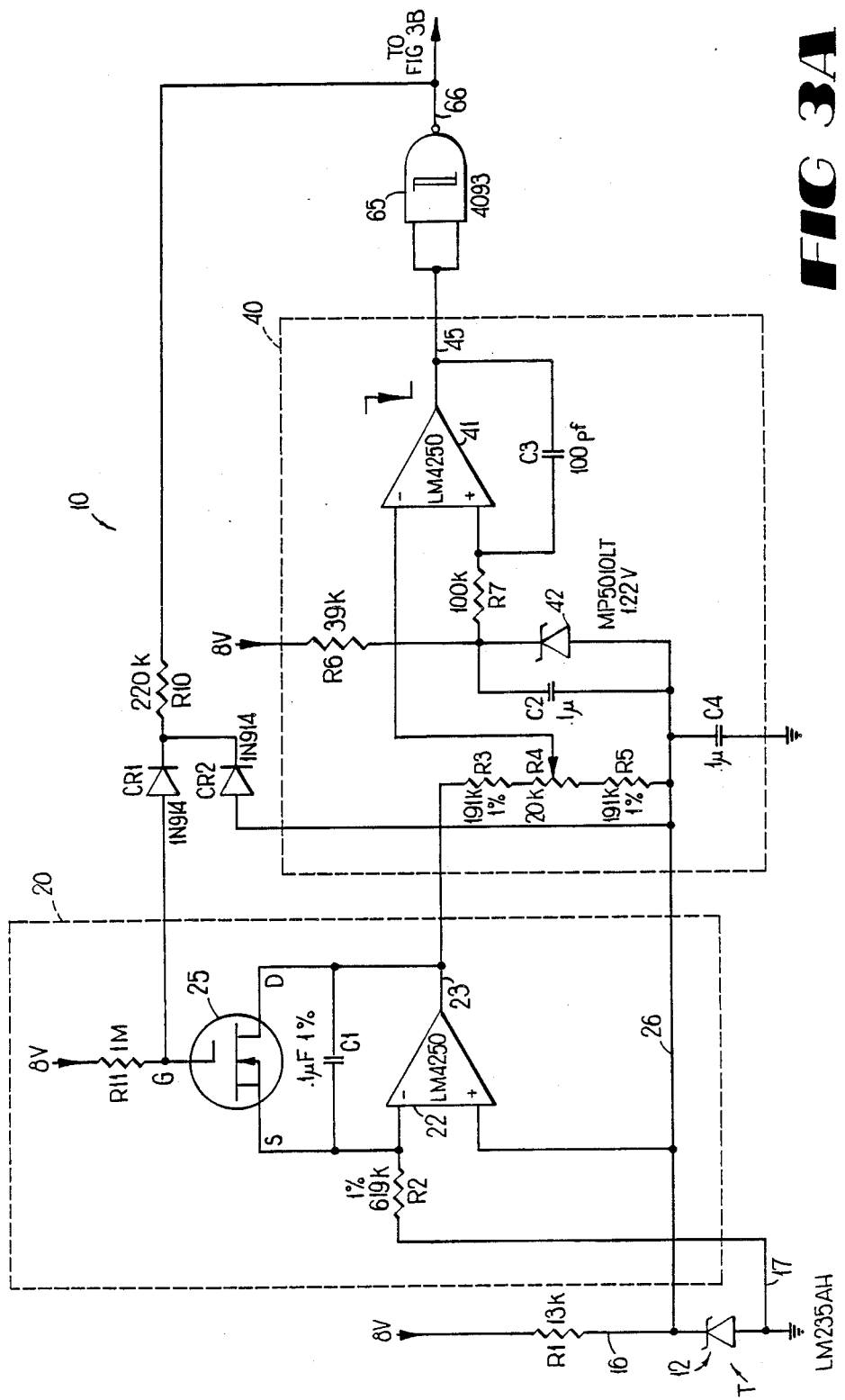

TEMPERATURE TRANSDUCER FOR KYZ PULSE RECORDER

TECHNICAL FIELD

The present invention relates generally to parameter monitors, and more particularly relates to a temperature transducer for an electrical utility KYZ pulse recorder.

BACKGROUND OF THE INVENTION

Electric utilities frequently log ambient temperature as a part of their electric usage surveys. The primary purpose of such logging is to measure the ambient temperature associated with a particular electric meter or data recorder. These surveys are used to determine the power usage at a given site, for example a residence or commercial office, so as to allow correlation of power usage with outside temperature. This provides the utilities with an idea as to how much power it takes to run air conditioners or electrical heaters, both which are known heavy electrical power users.

Presently available devices for measuring temperature typically convert temperature to pulses for a survey recorder, such as a KYZ data pulse recorder. Prior art approaches require a source of external power, and typically also require a connection to an external temperature sensing element such as a thermocouple.

In one prior art device, eight different terminals are required for connection of the temperature monitor to the data recorder. These terminals include: two terminals for receiving 110 volts AC for system power, two terminals for providing the pulse output, a terminal for safety-grounding the device, and three terminals for connecting an external temperature probe. Needless to say, the provision of a plurality of terminals complicates the usage of the device since several electrical connections must be made every time a device is installed or repaired. Moreover, provision must be made for running power cables, signal cables, and probe wires. While such a configuration with a remote temperature probe may be preferred in some applications, for example, if the temperature inside a transformer is to be measured, a more widespread application is in the measurement of ambient temperature for correlation of temperature with power usage. For such applications, additional wire connections and the requirement for an external power supply is impractical and may make the application cost-prohibitive.

SUMMARY OF THE INVENTION

The present invention provides an improved self contained, stand alone temperature transducer, particularly suited for connection to a conventional electric utility data recorder having a KYZ pulse input. The device may be mounted wherever it is desired to measure temperature, preferably in the shade. The device receives its power from the KYZ input of the data recorder, and does not require a separate power source. Advantageously, therefore, the device may be plugged into the standard KYZ input of the data recorder, and no other connections are required. Only a single three-wire cable is required for all signal and power connections to the recorder. It is low cost and simple to connect, therefore making it quite suitable for residential and commercial temperature measurement for correlation with power consumption.

Briefly described, the present invention is a temperature transducer for an electrical utility data recorder having a KYZ input, and includes means for sensing the temperature and for providing temperature signals, pulse means responsive to the temperature signals for providing a pulse output at a frequency proportional to the temperature sensed by the sensing means, and KYZ output means for providing the pulse output as KYZ pulses to a data recorder or other device having a KYZ input.

More particularly described, the present invention comprises a temperature transducer circuit which includes a temperature sensor that provides a sensor output voltage level proportional to temperature. A ramp generator or integrator generates a voltage ramp having a slope proportional to temperature. A comparator compares the voltage ramp to a predetermined temperature-compensated reference level, and provides thereby an output pulse. The output pulses occur at a frequency proportional to the temperature. The pulses are then provided to a frequency divider which divides the frequency of the pulse output to a frequency corresponding to the input requirements or specifications of the data recorder KYZ input.

Yet still more particularly described, the present invention includes an improved integrating circuit as a ramp generator which is extremely low power. The disclosed embodiment draws its power from the KYZ input pullup resistors in the data recorder, so all components are CMOS or other low power circuitry, and special techniques are employed to minimize power consumption.

The preferred integrating circuit employed in the present invention comprises an amplifier for amplifying the input signal from the temperature sensor, which is to be integrated. An integrating capacitor is connected to feed back the output of the amplifier to an input of the amplifier. A field effect transistor (FET) having its source and drain terminals shunted across the integrating capacitor is provided for discharging the capacitor upon completion of an integration. A voltage limiting means is provided for preventing the voltage at the gate terminal of the FET from falling below the voltage at the source terminal.

Also disclosed is an improved circuit for voltage referencing the gate of the FET to the source without compromising the accuracy of the measurement of the temperature sensor or needlessly consuming power. The preferred voltage referencing or limiting means comprises a diode having its anode connected to the gate and its cathode connected to a resetting means for the integrator. A second voltage matching diode is provided, also connected to the resetting means. Thereby, the amplifier is operative to maintain the voltage of the inverting input at about the same level as the non-inverting input, referencing through the diodes the gate to the source. This obviates the conventional use of a resistor connected between the gate and the source, which would affect the accuracy of the device since it is connected to the node connected to the integrating RC network.

Accordingly, it is an object of the present invention to provide an improved temperature transducer for use with an electrical utility data recorder.

It is another object of the present invention to provide an improved parameter monitor for connection to the KYZ input of a electrical utility data recorder.

It is another object of the present invention to provide a temperature monitor for an electric utility which facilitates the correlation of ambient temperature with electrical power usage by the utility.

It is another object of the present invention to provide a temperature transducer which is accurate, low cost, easy to connect, and consumes very little power.

It is another object of the present invention to provide a temperature transducer which minimizes the number of external connections and cables which must be provided to connect to a data recorder.

It is another object of the present invention to provide a temperature transducer for a KYZ pulse recorder which does not require an external source of power such as a battery or 110 volts AC.

It is another object of the present invention to provide an extremely low power temperature transducer circuit which is conveniently usable with conventionally available data recorders and which can draw power for operation from the inputs of the data recorder without affecting the transmission of information to the input of the data recorder.

It is another object of the present invention to provide an improved integrating circuit having improved accuracy which does not require an accuracy-affecting resistor to be connected between the gate and source of an FET employed in the discharging or resetting circuitry of the integrator.

It is another object of the present invention to provide an improved temperature transducer which requires no external sensor or connections other than the connection providing the signals transmitting the information.

These and other objects, features, and advantages of the present invention may be more clearly understood and appreciated from a review of the following detailed description of the disclosed embodiment and by reference to the appended drawings and claims.

DETAILED DESCRIPTION OF THE PREFERRED EMBODIMENT

Figure 1:
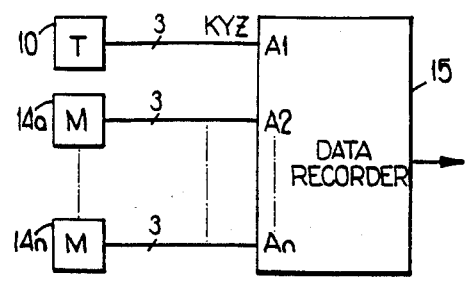
FIG. 1 is a system block diagram illustrating connection of the preferred embodiment of a temperature transducer constructed in accordance with the present invention to an electrical utility data recorder.

Referring now to the drawings, in which like numerals indicate like elements throughout the several views, FIG. 1 is a system diagram which illustrates connection of a preferred temperature transducer circuit 10 constructed in accordance with the present invention to a conventional electric utility data recorder 15. The transducer circuit 10 is connected over a three-wire KYZ line to one input A1 of a plurality of KYZ inputs A1 . . . An of the data recorder 15, in the manner as would be connected conventional electric meters 14a . . . 14n.

Those skilled in the art will understand and appreciate that the three-wire KYZ input comprises a common wire, and two wires or lines which "toggle" in a phased relationship with each other to signify the transmission of information, and is particularly suited for debouncing of switch contacts which were formerly used in such electric utility meters. Thus, it will be appreciated that the temperature transducer 10 is connected exactly as conventional electrical utility meters are connected. Details of the construction of the KYZ input in the data recorder are found in FIG. 4 and are discussed below.

Figure 2:
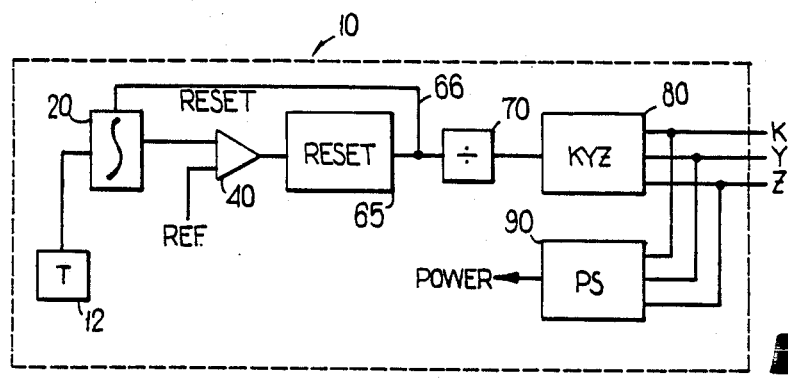
FIG. 2 is a block schematic diagram of the preferred circuitry of the temperature transducer illustrated in FIG. 1.

Referring now to FIG. 2, the preferred embodiment of the temperature transducer 10 comprises a transducer element or sensor 12 which is operative to measure the temperature and provide signals representative of the temperature. The output of the sensor 12 is provided to an integrator circuit 20 which functions as a ramp generator. The output of the ramp generator or integrator 20 is connected to a comparator circuit 40, which compares the output of the integrator to a temperature-stable reference voltage input. When the output of the integrator 20 exceeds the reference, a signal is provided on the output of the comparator circuit 40 to a reset circuit 65, which provides a RESET signal on line 66 to the integrator circuit 20, to begin a new integration or ramp.

The output of the reset circuit 65 is a train of pulses at a frequency proportional to the temperature measured by the sensor 12. In addition to resetting the integrator circuit 20, the train of pulses from the reset circuit 65 is provided to a frequency divider circuit 70, which divides the frequency into a frequency which is more manageable by the KYZ data recorder. Those skilled in the art will understand that many conventional electric utility data recorders are configured to receive a predetermined number of pulses within a given time interval. This time interval is typically established by the electric utility customer. However, the disclosed embodiment of the present invention is constructed with extremely low power but highly accurate components, which result in a frequency higher than normally expected in the KYZ input. Accordingly, the frequency divider circuit 70 divides this pulse train into a scaled-down but proportional frequency pulse train within the input specifications of the recorder.

The output of frequency divider 70 is provided to a KYZ driver circuit 80, which drives the three KYZ lines. The three KYZ lines are in turn provided to the data recorder.

Also provided is a power supply 90, which is connected in parallel with the KYZ driver circuit 80. The power supply circuit 90 draws power from the alternating toggling of the Y and Z lines by the driver circuit 80, and provides the power to the other components in the circuit. Accordingly, it will be appreciated that the entire circuit is self-contained and stand-alone, without requiring a separate power source for additional wires or connections, other than the standard KYZ connection directly to the data recorder.

Because the temperature transducer circuit 10 derives its power from the KYZ inputs, it is much more particular about the recorder input voltage and current specifications than a normal pulse initiator such as a utility meter. Thus, it should be understood that the preferred embodiment of the present invention is particularly suited for operation with the Sangamo type DS-100 series data recorders, also known as the DATA STAR recorders, manufactured by Sangamo-Weston, Inc., Atlanta, Ga. These recorders have a grounded K, and the Y and Z lines each have a 4.7 k resistor pulling up to 12 volts in the recorder.

Figure 3B:
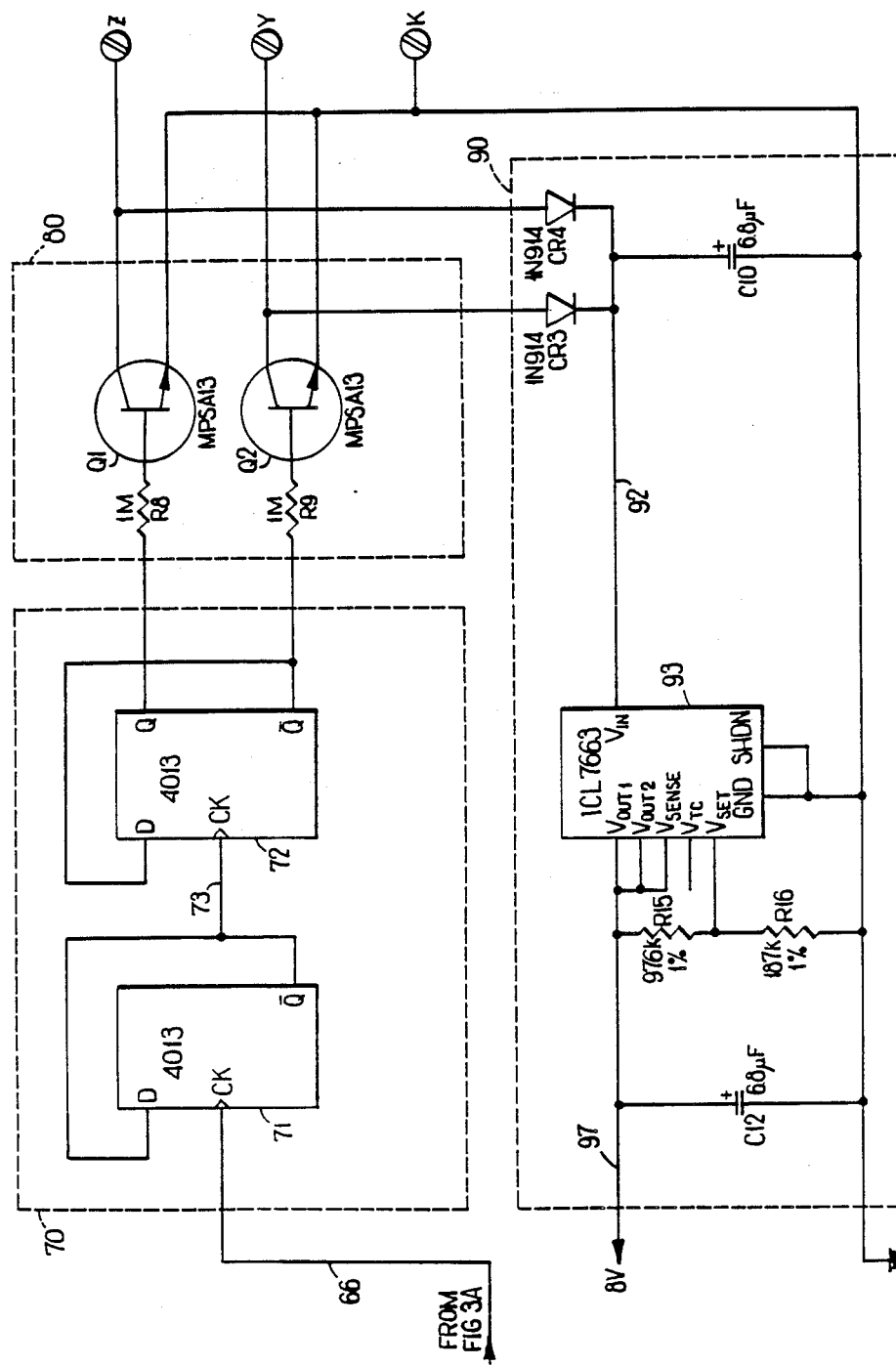
FIG. 3 is a detailed schematic diagram of the preferred circuitry illustrated generally in FIG. 2.

Referring now to FIG. 3, next will be described the details of the circuitry of the preferred embodiment of the temperature transducer circuit 10. For sensing temperature, a temperature sensor 12 is mounted within the enclosure housing the entire transducer circuit 10. In the preferred embodiment, the temperature sensor 12 is mounted to the circuit board together with other electronic components, and there is thus no external sensor or connections are required. The preferred temperature sensor 12 is a type LM235AH integrated precision temperature sensor, manufactured by National Semiconductor Corp., Santa Clara, Calif. The sensor 12 is an integrated circuit which generally appears in circuit as a two-terminal zener diode, having a breakdown voltage which varies directly proportionally to absolute temperature, at +10 mV per °K. Details of the operation of the circuit are contained in the literature supplied by the manufacturer.

The apparent anode of the sensor 12 is referenced to ground on line 17, while the apparent cathode is pulled up on line 16 through a 13 kΩ biasing resistor R1 to +8 V. The voltage at the cathode will be the characteristic "output" voltage of the sensor 12, and is proportional to temperature. At ambient temperature of about 27° C. (300° K.), the output of the sensor 12 is about 3.0 volts output; when calibrated, 2.982 volts at 25° C. Calibration is effectuated with a potentiometer R4, in the manner to be described in connection with the comparator circuit 40.

The entire temperature transducer circuit 10 produces pulses at a rate proportional to the output voltage of the sensor 12. The integrator circuit 20 sets the pulse rate. The integrator circuit employs a single integration technique, wherein the input voltage is integrated over a predetermined time period. The slope of the output of the integrator 20 is directly proportional to temperature.

The integrator circuit 20 includes a differential operational amplifier (op amp) 22, which in the preferred embodiment is a type LM4250 programmable operational amplifier, manufactured by National Semiconductor. An integration capacitor C1 is connected between the output 23 of amplifier 22 and the inverting input. Capacitor C1 is preferably 0.1 μF, 1%, for accuracy.

The integrator 20 is reset with a field effect transistor (FET) 25. A type VN22221 n-channel enhancement mode FET, manufactured by Siliconix, Inc., Santa Clara, Calif., which employs an input protection diode, is employed in the preferred embodiment. A type BS107, A FET, manufactured by Motorola, Inc., Phoenix, Ariz., which does not include an input protection diode, is also operative in an alternative embodiment. The FET 25 is positioned in the feedback loop of the operational amplifier circuit 22. When the integration reaches the voltage set by the comparator circuit 40, to be described below, the FET 25 is caused to conduct to discharge the integration capacitor C1, and restart the integration. The discharge path for the capacitor C1 upon resetting is essentially the internal conducting resistance of the FET 25, which is about 7 ohms.

The output voltage on line 23 is also provided to comparator circuit 40, and in particular through a calibration voltage divider network which includes a calibration potentiometer R4, preferably 20 kΩ. Precision resistors R3 and R5, both 191 kΩ, 1%, also form part of the calibration voltage divider. The potentiometer R4 should be adjusted to calibrate the circuit to a known pulse rate output when the system is placed in a constant temperature test fixture. Proper calibration of the preferred embodiment of the present invention will make use of a test fixture wherein the ambient temperature is closely controlled. The calibration potentiometer R4 should be adjusted until the pulse rate output is at a known preset frequency corresponding to the known ambient temperature.

A type LM4250 op amp 41 is included in the comparator circuit 40 for performing a voltage comparison operation. The wiper of calibration pot R4 is connected to the inverting input, while a reference voltage level at the noninverting input is established by a voltage reference circuit 42. The voltage reference circuit 42 in the preferred embodiment is a very temperature stable circuit which has the circuit appearance of Zener diode, preferably a type MP5010LT, manufactured by Micro Power Systems, Inc. This device is a two terminal, band gap voltage reference which provides a fixed 1.22 V output regardless of temperature (within certain extremes, of course). The apparent cathode of the circuit 42 is connected to +8 V through 39 kΩ resistor R6 as a current source required for circuit operation, and also through 100 kΩ high impedance input resistor R7 to the noninverting input to the comparator 41. A 0.1 μF capacitor C2 is connected across the apparent anode and cathode helps smooth out any fluctuations which might be caused by noise of the circuit itself or from an external source.

The input resistor R7 at the noninverting input to the comparator 41 is preferably selected so that this input will see the same approximation input impedance as the inverting terminal, from the wiper of calibration potentiometer R4. This will maintain the input bias currents at about the same level, in the known manner.

When the tap of the voltage divider potentiometer R4 reaches the reference voltage level established by the voltage reference circuit 42, the comparator 41 changes state and goes low on output line 45. This low level will remain only so long as the integrator circuit 20 exceeds the reference level provided by the voltage reference circuit 42. When the integrator is reset, the output of the integrator will drop rapidly, and might cause the comparator output to go high before a sufficiently wide pulse has been generated. Thus, a 100 pF feedback capacitor C3 connected between the output of the comparator amplifier 41 and the noninverting input allows selection of the length of the pulse provided when the comparator changes state. When the comparator changes state high to low, after the device gate delays the FET 25 starts discharging capacitor C1. The comparator 41 will however turn back off again (go high) whenever the input voltage on the inverting input drops. The capacitor C3 holds the voltage at the noninverting input at a low level long enough to ensure that the capacitor C1 is completely discharged, about 0.1% of the ramp time or about 50 μS at ambient temperature. This time may be adjusted by varying the value of C3.

The comparator circuit 40 is connected to a Schmitt trigger 65, which provides a sharply defined pulse for resetting the integrator 20 and for the transducer output. When the comparator 41 goes low, the Schmitt trigger 65 provides hysteresis so that only a single pulse output is provided on line 66, and the signal is inverted to a high level. The toggling of the Schmitt trigger 65 is provided on the line 66 through resistor R10 (a 220 kΩ current limiting resistor) and diode CR1 to the gate G of FET 25. This action reverse-biases both diodes CR1 and CR2, raising the voltage at the gate G of the FET to near eight volts, causing the FET to conduct. This terminates the integration, since the FET provides a discharge path for the integration capacitor C1.

In some prior art FET circuits, a resistor is tied between the gate and the source so as to reference the gate voltage to the source voltage. Were this done, however, the resistor would affect the accuracy of operation of other circuitry connected to the source because it would draw current from the input to the amplifier 22. Advantageously, no such resistor is required in the present invention. Instead, in the present invention the gate is referenced to the source in a different manner. The gate is connected through diode CR2 to the line 26, which it will be recalled is connected to the noninverting input of the amplifier 22. Diode CR2 is actually present only to match the voltage drop of diode CR1, which provides a one-way current path to ground in the Schmitt trigger 65; the gate is pulled to ground by the Schmitt trigger for resetting. When the integrating amplifier 22 is in equilibrium, both input terminals will be at the same voltage because of these matching diodes.

In normal operation, the source of FET 25 will be driven to about three volts (the voltage of the sensor 12) by the amplifier 22. The arrangement of diodes CR1, CR2 effectively creates a voltage reference for the gate of the FET 25, namely, the other input to the amplifier 22, without requiring a power-consuming element such as a resistor. In other words, accuracy is enhanced by indirectly referencing the gate to the source. This is accomplished by referencing the gate to one input of the amplifier, referencing the source to the other input, and relying on the operation of the amplifier to drive the difference between these inputs to zero. Since the amplifier 22 is operative to drive the inverting input to the same voltage level as the noninverting input, the gate is effectively referenced to the source. In this manner, the gate is referenced to the source without connecting a device between the source and gate which might affect the accuracy of the integrator.

Essentially, the circuit is using the voltage on line 26 as a "floating" reference for the op amp 22. Because of the negative feedback provided through capacitor C1, the voltage at the inverting and noninverting inputs is the same. Advantageously, therefore, a reference voltage level is provided for the integrator circuit 20 without requiring use of active circuit components that draw power. This technique allows referencing the gate of the FET 25 to the source without drawing any current from the source of the FET, thereby increasing the accuracy, since any current drawing from the node connected to the source will affect the charging of the integrator capacitor and affect accuracy.

However, it should be understood that the floating reference on line 26 has other ramifications in the operation of the integrator circuit 20. The integrator is integrating the output of a device which is referenced to ground, namely, the temperature sensor 12, yet the integrator itself is not capable of having its inputs go to ground. In other words, the inputs to the op amp 22 in the integrator circuit must reference some common voltage level above ground for proper operation, and ramp up to the voltage level reference at the comparator. While there are op amps commercially available which allow referencing to ground on the inputs, these devices typically use more power than the preferred LM4250 type device.

In the configuration illustrated in FIG. 3, the voltage at the op amp inputs never goes below the voltage at the cathode of the temperature sensor 12, even though this sensor is tied to ground at its anode. The negative input to the op amp 22 is tied through resistor R2 to ground, but the voltage at this negative input never goes to ground. The positive or noninverting input is tied directly to the positive side of the temperature sensor 12, which will be maintained about three volts at ambient temperature. The op amp will change its output to try to make the inverting input at the same voltage level as the noninverting input. Accordingly, the output of the op amp 22 goes positive toward the supply rail, forcing current into the integration capacitor C1 to charge it. This constant current supplied by the op amp output produces a constant slope voltage ramp, indicative of the integration. Thus, the output voltage rises constantly during integration, pulling up the inverting input of the op amp 22. Since there is a voltage drop across R2, the inverting input never reaches ground potential (at least during the linear or integration operation).

Although line 26 actually varies with respect to circuit ground, it is more convenient to understand circuit operation from the standpoint that line 26 is a reference. Another way to look at this is as follows. The high temperature coefficient voltage reference 42 will always be 1.22 volts above line 26. Line 26 is of course tied both to the positive terminal of the temperature sensor 12 as well as to the noninverting input of amplifier 22. Accordingly, the temperature sensor 12 varies its voltage negatively with respect to line 26, if one assumes that line 26 is the reference. It will therefore be appreciated that although resistor R2 is grounded, because the amplifier is referenced to a voltage which varies with the parameter to be measured it will always be trying to drive its inverting terminal to the same value as line 26, thus charging capacitor C1. Moreover, the slope of the ramp generated by the amplifier ($dV_o/dt$) will be proportional to the voltage $V_i$ across the sensor 12, because of the conventional op amp integrator equation:

$$V_o = 1/R2C1 \int V_i dt \qquad (1)$$

$$dV_o/dt = V_i/R2C1 \qquad (2)$$

Note that the term $1/R2C1$ is a positive term because of the fact that $V_i$ is negative with respect to the noninverting terminal.

Figure 5:
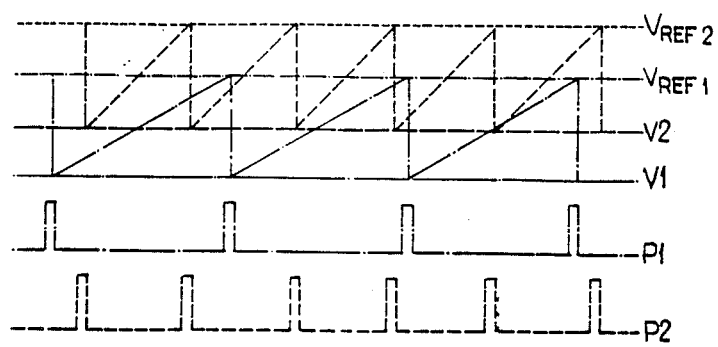
FIG. 5 illustrates exemplary outputs of the integrator circuit and pulse circuit employed in the preferred embodiment shown in FIG. 3.

A typical ramp time for the integrator circuit 20 is 50 mS at 27° C. Assume in FIG. 5 that this is the case. Then, the output of the circuit will be the pulse train P1, which is a predetermined frequency proportional to this temperature. The output of the integrator yielding this pulse train P1 is the voltage $V1-V_{REF1}$. On the other hand, assume that the temperature increases to above 27° C. In this case, pulse train P2 is generated, at a frequency higher than that of P1. The output of the integrator for this pulse train is $V2-V_{REF2}$. It will be noted that the latter output has a steeper slope than $V1-V_{REF1}$.

Still referring to FIG. 3, in the preferred embodiment the pulse train output on line 66 from the Schmitt trigger 65 is provided to a frequency divider circuit 70 for reduction to a frequency compatible with the input specifications of the preferred data recorder. It should be understood that the usage of the frequency divider circuit 70 may not be required in all applications of the present invention. The preferred DATA STAR recorder with which the disclosed embodiment is particularly operative has specifications for input signals below a predetermined frequency. With only minor modifications involving the selection of R2 and C1, it is easy to configure the integrator 20 and comparator 40 to provide a temperature-proportional pulse rate within the input capabilities of the recorder.

However, it will be understood by those skilled in the art that accuracy is an object of the present invention. The 0.1 μF integrating capacitor C1 is relatively large for stable yet inexpensive capacitors; a larger capacitor might jeopardize the balance between accuracy and low cost. Moreover, resistor R2 on the input to the integrating amplifier 22, at 619 kΩ, is fairly large for a precision resistor. Either a larger capacitor C1 or resistor R2 would be required for a slower ramp time for the integrator, or alternatively, a higher end voltage would result in a slower integration time. But of course, a higher end voltage would require a higher power supply voltage. On balance, in the preferred embodiment it is believed that it is preferable to select the components within the cost, power consumption, and accuracy considerations by having operation at a higher frequency and to divide the frequency to a more manageable level.

The preferred DATA STAR recorder is specified as counting 4,095 counts per "interval." The user selects the length of the interval, with the minimum interval being one minute and the maximum being sixty minutes. The disclosed temperature transducer circuit 10 provides 600 pulses per minute at 27° C. The recorder stores a count of the number of pulses received from the temperature transducer circuit 10 during each interval; there is thus a temperature associated with each interval. This count, which is converted into degrees, may then be correlated by the recorder with the power usage. The resolution of the disclosed embodiment is one degree C. This resolution can be improved by use of greater precision components, and achieve one-half degree C.

In the frequency divider circuit 70, line 66 is also connected to the clock input (CK) of a first D-type flip flop 71 contained therein. The clock input (CK) of a second D-type flip flop 72 is connected to the not-Q output of flip flop on line 73. Both flip flops 71, 72 are configured in a divide-by-two arrangement, with the not-Q output being tied back to the D input. Also, both flip flops are preferably CMOS type 4013 or equivalent for low power consumption. The output of the second D flip flop 72 provides the pulse train at a frequency proportional to the temperature.

Figure 4:
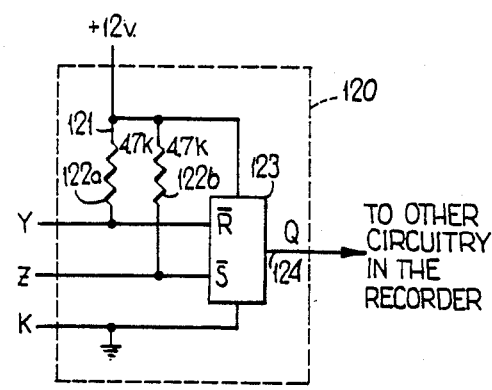
FIG. 4 is a detailed schematic diagram of the input section of an exemplary electrical utility data recorder with which the present invention is operative.

The output of the frequency divider circuit 70 is the Q and not-Q outputs of the flip flop 72. These outputs are provided to a KYZ driver circuit 80. In particular, the Q output of the flip flop 72 is connected through a 1 MΩ resistor R8 to the base of a driver transistor Q1, while in like manner the not-Q output is connected through a similar resistor R9 to the base of a transistor Q2. Both transistors Q1, Q2 are preferably type MPSA13 npn or equivalent. The emitters of both transistors Q1, Q2 are commonly connected to the K signal line, and thus to the circuit ground reference voltage level for both the transducer circuit 10 as well as the recorder input circuit 120 (FIG. 4). As described earlier, the Y and Z lines will toggle alternately high and low; thus, the collector of transistor Q1 drives the Z line, while the collector of Q2 drives the Y line. The transistors Q1 and Q2 provide a current sink for the inputs of the data recorder, such as circuit 120 in FIG. 4, to be described next.

One important object of the present invention is the self powering ability, that is, no separate source of power is required for the operation of the preferred embodiment. Rather, sufficient power is obtained from the pull up circuitry on the KYZ inputs of the data recorder 15, since low power circuitry is employed throughout. Referring in this regard to FIG. 4, this figure illustrates a typical KYZ input circuit 120 for the preferred Sangamo DS-100 series data recorder with which the preferred embodiment of the present invention is conveniently operative, although it will be understood that the present invention may easily be made operative with other types of data recorders with only minor modifications.

As shown in FIG. 4, the input circuit 120 comprises an RS flip flop 123, with the R input being connected to the Y line and the S input being connected to the Z line; the line K is ground or reference. A twelve volt power source is provided on line 121, through 4.7 kΩ pull up resistors 122a, 122b, to the Y and Z lines, respectively, of the circuit. In conventional operation wherein the input circuit 120 receives inputs from an electric meter, Y and Z are alternately toggled low, with a transition occurring when Y goes high and simultaneously Z goes low, or alternatively Y goes low and Z goes high. Each such transition is known as one "pulse". Y and Z are driven low by the temperature probe or transducer circuit 10 of the present invention in a manner similar to that as would occur for a KYZ pulse input from an electric meter; the high is a passive high provided by the pullup resistors 122a, 122b.

When the state of either line Y or Z is a high, there is current sourced from the resistors 122a, 122b out through the Y or Z lines to the transducer circuit 10. Thus, whichever line Y or Z is in the high state will be sourcing current for powering the disclosed embodiment of the transducer circuit 10. If advantage is to be taken of the power available from the input of different types of data recorders, however, it should be understood that the KYZ or other input circuit must have pullup resistors or other active elements capable of providing some nominal current and voltage to the remotely located temperature transducer 10.

It will be appreciated that only Q1 or Q2 in the KYZ driver circuit 80, but not both at the same time, are conducting. The alternating conduction of the transistor Q1 and Q2 alternately sets and resets the flip flop 123, causing a pulse to appear on the Q output on line 124, which is provided to other circuitry (not shown) in the data recorder which is responsive to the pulses for recording the occurrence of same. It should be noted that the Y and Z pulse outputs from transistors Q1 and Q2, when they are in the nonconducting state, must be high enough to be recognized on the inputs to the circuit 120, to set and reset flip flop 123. If too much current is being drawn by the temperature transducer circuit 10 of the present invention, the pull up resistors 122a, 122b will not be able to pull the voltage high enough for a valid signal to be recognized.

It will be understood that the preferred DATA STAR recorder includes a plurality of input terminals as illustrated generally in FIG. 1, each having an input circuit 120 constructed in the manner of FIG. 4. One will be dedicated to temperature measurement instead of power measurement in applications employing the present invention. In the preferred mode of operation, the data recorder will be programmed to recognize that the pulses arriving from the input connected to the temperature transducer 10 represent temperature and are not the usual KYZ pulses from an electric or watt-hour meter. The software in the computer which reads the recorder will convert the number of pulses received in a given time into a number representative of temperature, since the pulse frequency is proportional to temperature.

Turning now to a consideration of the power supply 90 for the preferred embodiment, reference should again be made to FIG. 3. Eight volts was selected in the preferred embodiment as the circuit supply voltage. This is a level high enough for proper operation of the selected components, realizing that there will be voltage drops occurring because of the voltage regulator 93 and that only limited current is available through the pull up resistors 122a, 122b in the data recorder input circuit 120.

In FIG. 3, the Y and Z lines are connected through diodes CR3, CR4, preferably type 1N914, to a common line 92. Line 92 is connected to the input to a voltage regulator circuit 93, as well as to a capacitor C10, preferably 6.8 $\mu$F, which operates in the known manner to filter the transients which occur as the Y and Z lines change state. In the preferred embodiment, voltage regulator 93 is a type ICL7663 high efficiency programmable positive voltage regulator, manufactured by Maxim Integrated Products or by Intersil. The output of the power supply circuit 90, at 8 volts, is provided on line 97 to the other circuit components. Resistors R15, R16, at 976 k$\Omega$ and 187 k$\Omega$, respectively, constitute a voltage divider network for setting the output voltage of the regulator 93, in the manner described in the literature provided by the manufacturer. Capacitor C12, which is preferably 6.8 $\mu$F, serves as a conventional power supply output filter.

It will now be appreciated that a significant advantage provided in the present invention is that it only requires three terminals for its connection to the data recorder, the K, Y, and Z lines. No special connections are required for power, nor is any separate battery or power supply required. The data generated by the device is transmitted to the receiver or recorder over the same signal lines as the power lines. This contrasts to prior art devices which require separate power, output, and ground terminals.

Another advantage to be appreciated is the length of separation between the recorder and the temperature transducer. In typical applications, there will be some distance between the recorder and the electrical meters across a switchyard. Noise immunity is inherent in the KYZ pulse arrangement, because of its relatively slow signal rate and alternating or out-of-phase YZ toggling. Thus, it is believed that the temperature transducer 12 will operate satisfactorily as much as 1,000 feet and possibly more from the data recorder.

As described earlier, one of the objects of the present invention is extremely low power consumption so that the circuit may operate without any power supply other than from the input circuit in the data recorder. It will thus be appreciated that the temperature transducer circuit 10 is arranged to minimize power consumption, inasmuch as power for the preferred embodiment is "drawn" from the input pull up resistors in the input stage of the data recorder. In addition to the use of low power integrated circuit components, other techniques are employed in the present invention to minimize power usage. For example, and referring again to FIG. 3, the biasing current through the voltage reference circuit 42 is "used twice", in the following manner. The apparent anode of the circuit 42 is connected to line 26 in the integrator circuit 20. This line 26, it will be recalled, is not circuit ground, although it is filtered to ground through 0.1 $\mu$F capacitor C4. After the biasing current is "used" in the circuit 42, it passes to the apparent cathode of the temperature sensor 12, where it is used as bias current for this circuit. Accordingly, some of the biasing current for the sensor 12 is provided on line 26, while the remainder is provided through the 13 k$\Omega$ resistor R1. Had this configuration not been employed, a lower resistor value would be required for R1, and the entire circuit would have drawn more current and thus used more power.

It will therefore be appreciated that the disclosed preferred embodiment of the present invention, which draws about 400 microamps, is an extremely low power circuit. About 90% of this current is required in the sensor 12. At about 10 volts input to the power supply circuit 90, usage of 400 microamps translates to an overall power consumption of 4 milliwatts.

The preferred embodiment of the present invention has been disclosed by way of example and it will be understood that other modifications may occur to those skilled in the art without departing from the scope and the spirit of the appended claims.

What is claimed is:

1. A self-contained parameter monitor for an electrical utility data recorder having a KYZ pulse input, comprising:
    a transducer responsive to a measurable phenomenon for providing a transducer output voltage level proportional to said measurable phenomenon;
    ramp generator means for generating a voltage ramp at a predetermined time constant starting at an initial state corresponding to said transducer output voltage level;
    comparator means for comparing said voltage ramp to a predetermined peak reference level and for providing output pulses, said output pulses occurring at a frequency proportional to measurement of said measurable phenomenon;
    said ramp generator means being responsive to said output pulses to reset to said initial state;
    pulse divider means responsive to said output pulses for dividing the frequency of said output pulses to a frequency corresponding to the input requirements of said data recorder KYZ input;
    KYZ output means for providing said frequency-divided output pulses as KYZ pulses to an apparatus having a KYZ input; and
    power supply means connected in parallel to said KYZ output means for drawing electrical power from said KYZ input and for supplying power to said transducer, said ramp generator means, said pulse divider means, said comparator means, and said KYZ output means.

2. The parameter monitor of claim 1, wherein said measurable phenomenon is ambient temperature.

3. The parameter monitor of claim 1, wherein said ramp generator means comprises an integrator.

4. The parameter monitor of claim 3, wherein said integrator comprises:

an amplifier for amplifying an input signal from said transducer;

an integrating capacitor connected to feed back the output of said amplifier to an input of said amplifier;

a field effect transistor having a source terminal and a drain terminal shunted across said integrating capacitor for discharging said capacitor upon the completion of an integration; and voltage limiting means for preventing the voltage at said gate terminal from falling below the voltage at said second terminal.

5. The parameter monitor of claim 4, wherein said amplifier is a differential amplifier responsive to amplify the difference between an inverting input and a noninverting input, and wherein said voltage limiting means comprises:

a first diode having its anode connected to said gate terminal and its cathode connected to a resetting means for said integrator; and a second diode having its anode connected to said noninverting input of said amplifier and its cathode connected to said resetting means, whereby said amplifier is operative to maintain the voltage at said inverting input at about the same level as said noninverting input.

6. The parameter monitor of claim 1, wherein said power supply means comprises a rectifier connected to each the Y and Z lines of said KYZ input, respectively, the cathodes of said rectifiers being commonly connected at a rectifier node, and a voltage regulator circuit connected to said rectifier node.

7. A temperature transducer for a data recorder, said data recorder including KYZ pulse input means, comprising:

a temperature sensitive element responsive to temperature for providing a temperature signal output corresponding to temperature;

integrating means for integrating said temperature signal over a predetermined time period and for providing an integrated output;

comparator means responsive to said integrated output for providing integrator reset pulses at a frequency related to temperature at said temperature sensitive element, said integrating means being responsive to each of said reset pulses for resetting for a subsequent integration;

pulse divider means responsive to said reset pulses for dividing the frequency of said reset pulses to a frequency corresponding to the input requirements of said data recorder;

KYZ output means for providing said frequency divided reset pulses a KYZ pulses to the KYZ input of said data recorder; and power supply means connected to said KYZ input of said data recorder for providing power to said temperature sensitive element, said integrating means, said comparator means, said pulse divider means, and said KYZ output means.

8. The temperature transducer of claim 7, wherein said integrating means comprises:

an amplifier for amplifying an input signal to be integrated;

an integrating capacitor connected to feed back an output of said amplifier to an input of said amplifier; and a field effect transistor having a source terminal and a drain terminal shunted across said integrating capacitor for discharging said capacitor upon the completion of an integration; and voltage limiting means for preventing the voltage at said gate terminal from falling below the voltage at said source terminal.

9. The temperature transducer of claim 7, wherein said pulse divider means comprises a plurality of D-type flip flops arranged with the inverting output connected to the D input.

10. The temperature transducer of claim 8, wherein said amplifier is a differential amplifier responsive to amplify the difference between an inverting input and a noninverting input, and wherein said voltage limiting means comprises:

a first diode having its anode connected to said gate terminal and its cathode connected to a resetting means for said integrator;

a second diode having its anode connected to said noninverting input of said amplifier and its cathode connected to said resetting means, whereby said amplifier is operative to maintain the voltage at said inverting input at about the same level as said noninverting input.

* * * * *